United States Patent
Dong et al.

(10) Patent No.: US 8,788,839 B1
(45) Date of Patent: Jul. 22, 2014

(54) SECURELY REPLACING BOOT LOADERS

(71) Applicant: Google Inc., Mountain View, CA (US)

(72) Inventors: Ke Dong, San Jose, CA (US); Michael Daniel Fuller, San Jose, CA (US); Shawn M. Ledbetter, Mountain View, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 13/648,689

(22) Filed: Oct. 10, 2012

(51) Int. Cl.
*G06F 21/00* (2013.01)
*G06F 21/57* (2013.01)

(52) U.S. Cl.
CPC .................................. *G06F 21/575* (2013.01)
USPC ............................................ 713/187; 713/2

(58) Field of Classification Search
None
See application file for complete search history.

(56) References Cited

U.S. PATENT DOCUMENTS

| | | | |
|---|---|---|---|
| 6,535,974 B1 | 3/2003 | Chang et al. | |
| 7,299,347 B1 | 11/2007 | Kao | |
| 7,425,992 B2 | 9/2008 | Feeler et al. | |
| 8,108,680 B2 | 1/2012 | Murray | |
| 8,595,716 B2 * | 11/2013 | Keller et al. | ................... 717/171 |

* cited by examiner

*Primary Examiner* — Gilberto Barron, Jr.
*Assistant Examiner* — Simon Kanaan

(57) ABSTRACT

A method of booting an electronic device includes verifying communicable connection of a sender input/output terminal of the electronic device to a receiver input/output terminal of the electronic device, using a first boot loader executing on a computing processor of the electronic device. The method further includes reading a signature of a unique identifier of the electronic device from a removable storage device received by the electronic device, verifying the signature of the unique identifier of the electronic device, and allowing installation of a second boot loader on the electronic device when the signature is valid.

30 Claims, 4 Drawing Sheets

SECURELY REPLACING BOOT LOADERS

TECHNICAL FIELD

This disclosure relates to replacement or installation of boot loaders on an electronic device.

BACKGROUND

A computing processor typically executes program code found in read-only memory (ROM), random access memory (RAM), or switches on an operator's front panel. Modern operating systems, application code, and data are generally stored on nonvolatile data storage devices, such as hard drives, CDs, DVDs, flash memory cards (like SD cards), USB flash drives, and floppy disks. When an electronic device, such as a computer or set top box is first powered on, it usually does not have an operating system in ROM or RAM. Instead, the device executes a relatively small program (e.g., stored in ROM), along with the bare minimum of data needed to access the nonvolatile devices from which the operating system programs and data may be loaded into RAM. The small program that starts this sequence is generally known as a bootstrap loader, bootstrap or boot loader. The boot loader loads other data and programs which are then executed from RAM. Often, multiple-stage boot loaders are used, during which several programs of increasing complexity load one after the other in a process of chain loading.

Sometimes the boot loader of a device needs replacement. When a single key is used to unlock the device for replacement of the boot loader, once hacked, a hacker can unlock all instances of the device using the hacked key. Unlocking a JTAG (Joint Test Action Group) interface of the device using a password to unlock the boot loader poses a security risk as well. This password is usually recorded per CPUID (central processor unit identifier) and controlled by a chip vendor and is not generally available to a manufacturer. Therefore, there is a long felt need for a secure method of replacing a boot loader of a device.

SUMMARY

One aspect of the disclosure provides a method of replacing a boot loader of an electronic device. The method includes verifying communicable connection of a sender input/output terminal of the electronic device to a receiver input/output terminal of the electronic device, using a first boot loader executing on a computing processor of the electronic device. The method further includes reading a signature of a unique identifier of the electronic device from a removable storage device received by the electronic device, verifying the signature of the unique identifier of the electronic device, and allowing installation of a second boot loader on the electronic device when the signature is valid.

Implementations of the disclosure may include one or more of the following features. In some implementations, the method includes sending a connection key from the sender terminal to the receiver terminal and verifying receipt of the connection key from the receiver terminal. The method may include generating the connection key as a random integer. Moreover, the method may include sending the connection key bit-by-bit from the sender terminal to the receiver terminal and verifying each received bit, confirming correct connection of the sender terminal to the receiver terminal. The method may include enabling a communication port receiving the removable storage device when correct connection of the input/output terminals is verified.

In some implementations, the method includes determining a presence of the signature of the unique identifier of the electronic device or the second boot loader on the storage device. The method may include reading of the second boot loader from the storage device and storing the second boot loader in memory of the electronic device. If the signature is invalid, the method may include disallowing installation of the second boot loader when the signature is invalid. If the signature is valid, the method may include booting the electronic device using the first boot loader. Moreover, the method may include rebooting the electronic device after installation of the second boot loader.

Another aspect of the disclosure provides a method of booting an electronic device that includes initiating execution of a first boot loader on a computing processor of the electronic device, communicably connecting a sender input/output terminal of the electronic device to a receiver input/output terminal of the electronic device, and connecting a removable storage device to a connection port of the electronic device. The storage device stores a signature of a unique identifier of the electronic device and a second boot loader. The first boot loader verifies correct connection of the input/output terminals, reads the signature of the unique identifier of the electronic device from the connected storage device, verifies the signature of the unique identifier of the electronic device, and allows installation of the second boot loader on the electronic device when the signature is valid.

In some implementations, the first boot loader sends a connection key from the sender terminal to the receiver terminal and verifies receipt of the connection key from the receiver terminal. The first boot loader may generate the connection key as a random number. In some examples, the first boot loader sends the connection key bit-by-bit from the sender terminal to the receiver terminal and verifies each received bit to confirm correct connection of the sender terminal to the receiver terminal. The first boot loader may enable the communication port when correct connection of the input/output terminals is verified.

The first boot loader may determine a presence of the signature of the unique identifier of the electronic device or the second boot loader on the storage device. Moreover, the first boot loader may initiate reading of the second boot loader from the storage device. If the signature is invalid, the first boot loader may disallow installation of the second boot loader and/or boot the electronic device using the first boot loader. The method may include rebooting the electronic device after installation of the second boot loader.

Another aspect of the disclosure provides an electronic device including a circuit having memory storing a first boot loader, a computing processor in communication with the memory and executing the first boot loader, and input/output terminals in communication with the computing process. The electronic device also includes a communication port in communication with the circuit. The first boot loader verifies correct connection of the input/output terminals, reads the signature of the unique identifier of the electronic device from a storage device (e.g., a universal serial bus flash drive or external device) connected to the communication port, verifies the signature of the unique identifier of the electronic device, and allows installation of the second boot loader on the electronic device when the signature is valid.

In some implementations, the first boot loader sends a connection key from the sender terminal to the receiver terminal and verifies receipt of the connection key from the receiver terminal. The first boot loader may generate the connection key as a random number. In some examples, the first boot loader sends the connection key bit-by-bit from the sender terminal to the receiver terminal and verifies each received bit to confirm correct connection of the sender terminal to the receiver terminal. The first boot loader may enable the communication port when correct connection of the input/output terminals is verified.

The first boot loader may determine a presence of the signature of the unique identifier of the electronic device or the second boot loader on the storage device. Moreover, the first boot loader may initiate reading of the second boot loader from the storage device. If the signature is invalid, the first boot loader may disallow installation of the second boot loader and/or boot the electronic device using the first boot loader.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
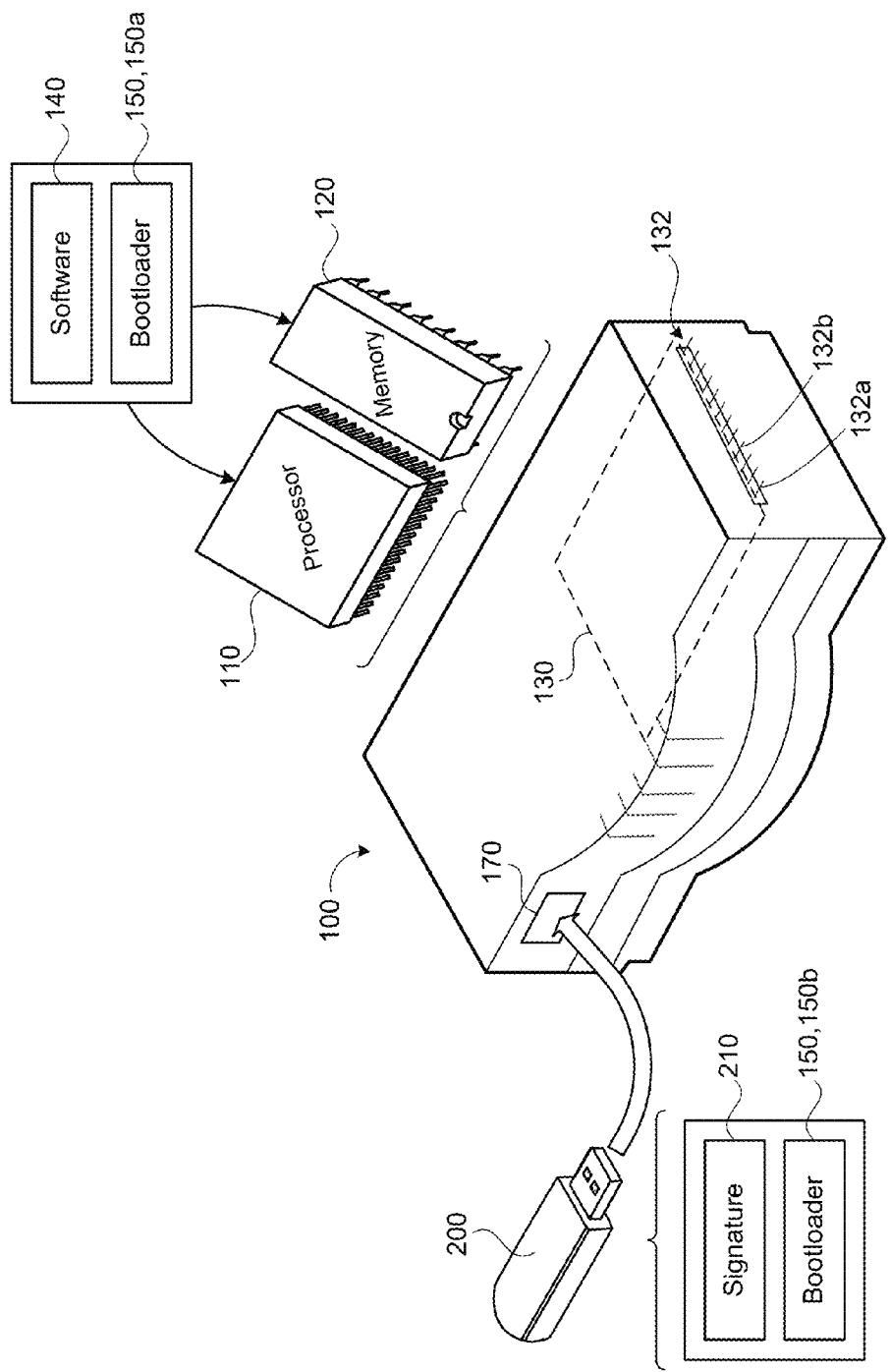
FIG. 1 is a schematic view of an exemplary electronic device receiving a removable storage device having a boot loader.

Referring to FIG. 1, in some implementations, an electronic device 100 includes a computing processor 110 in communication with memory 120 on a circuit 130. The processor may execute software 140 stored in the memory 120 that denies booting of the device 100 upon detection of tampering or replacement of a boot loader 150 (e.g., software code stored in memory 120). The computing processor 110 may execute the boot loader 150 upon power-up (e.g., turning on or "booting" of the device). The boot loader 150 may be used to initialize system clocks, internal memory 120, external memory interfaces, general input/output signals, serial interfaces, and/or digital video inputs and outputs. Examples of electronic devices 100 include, but are not limited to, storage devices, set top boxes (STBs), televisions, media players, etc. If the electronic device 100 becomes locked, i.e., refuses to boot, a user may send the device 100 for a return merchandise authorization (RMA), which is the process of having a product repaired or replaced by a retailer or corporation within the product's warranty period, for example, as part of a service agreement or warranty.

In some implementations, the electronic device 100 is used for digital rights management (DRM), which is a class of access control technologies used by hardware manufacturers, publishers, copyright holders and individuals with the intent to limit the use of digital content and devices after sale. DRM can be any technology that inhibits uses of digital content that are not desired or intended by the content provider. DRM may also include specific instances of digital works or devices.

When the electronic device 100 is used for DRM, all JTAG (Joint Test Action Group), console and I2C interfaces may become locked down upon detection of tampering, and there may be no practical way of diagnosing issues with the electronic device 100. If a provider of the electronic device 100 allows simple replacement of the boot loader 150, a security hole may exist for hackers. Instead, an authorized recovery method to replace the boot loader 150, based on both hardware and software security, provides a secure way of booting and allowing diagnosis of the electronic device 100. Undisclosed 10 (input/output) terminals 132 of the circuit 130 may be used to trigger the recovery process. Moreover, there may be little or no delay for the normal boot process. In some examples, the recovery procedure is generic, but the authorization is unique for individual electronic devices 100. If one electronic device 100 is hacked with a stolen signature file, it does not affect any other electronic devices 100 in the market.

The boot process may include checking signing in a chain. Secure replacement of a current boot loader 150a with a customized/new boot loader 150b allows access to control of the electronic device 100. In some implementations, a signature 210 (e.g., file) of a unique identifier (e.g., CPUID or serial number, non-modifiable identifier) of the electronic device 100 and the new boot loader 150b are stored on a memory or storage device 200, such as a universal serial bus (USB) device or other external memory device, removably receivable by the electronic device 100 by a connection port 170 (e.g., via a USB connector). A user may replace or upgrade the boot loader 150 and/or executable code of the electronic device 100 using a secure method of replacement.

Figure 2:
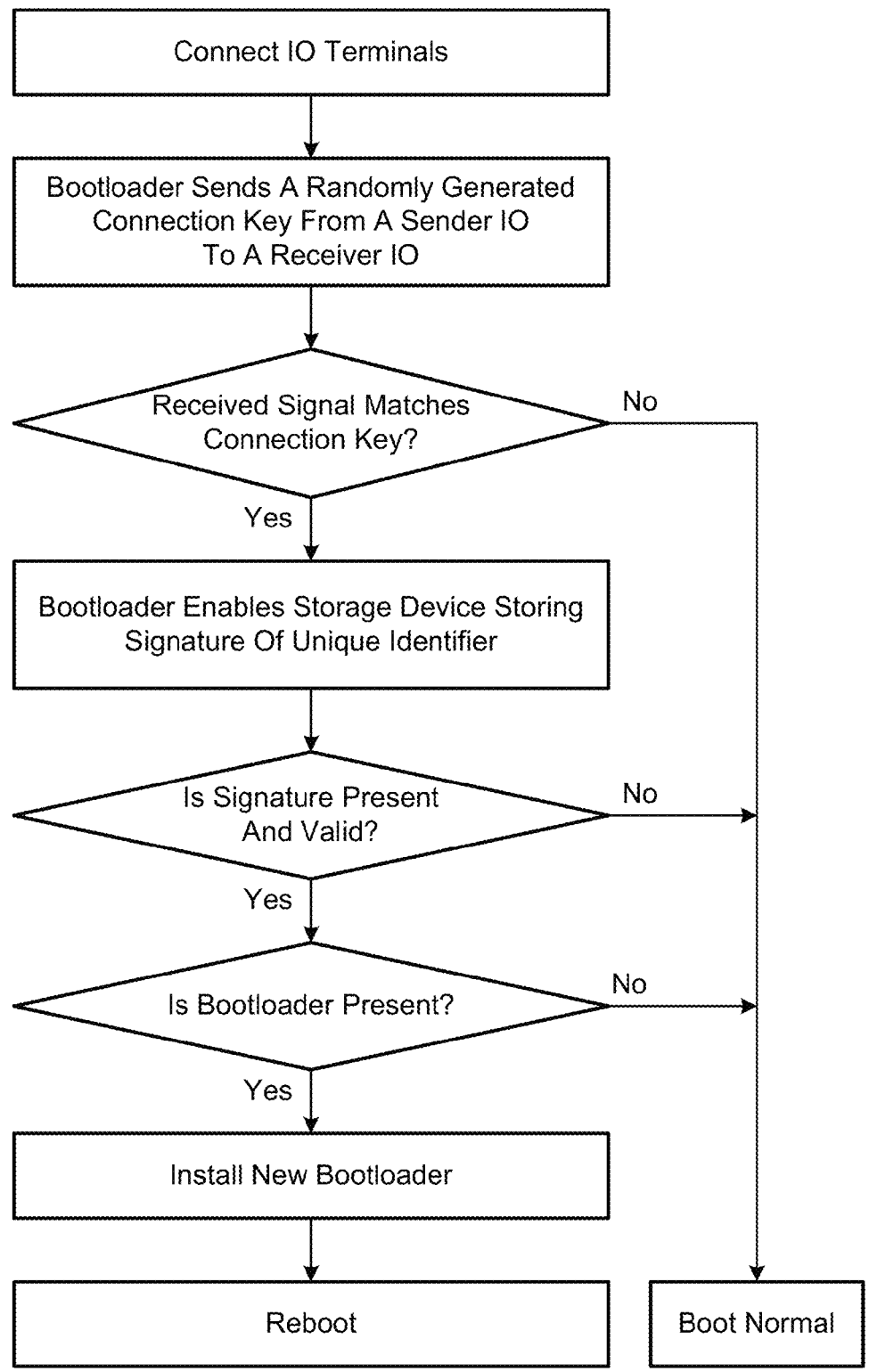
FIG. 2 is an exemplary arrangement of operations for a method of securely replacing a boot loader of an electronic device.
Figure 3:
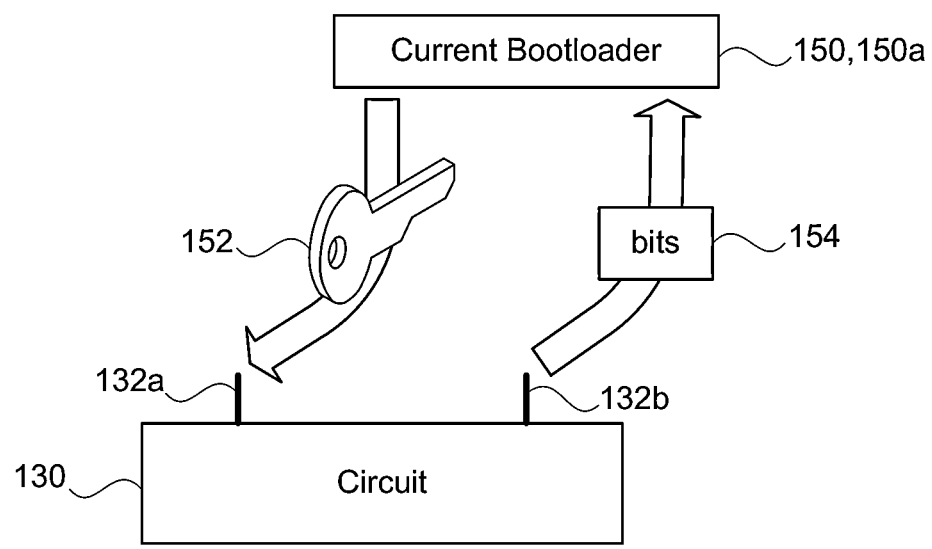
FIG. 3 is a schematic view of an exemplary boot loader sending a connection key to a sender input/output terminal and receiving the connection key back from a receiver input/output terminal.
Figure 4:
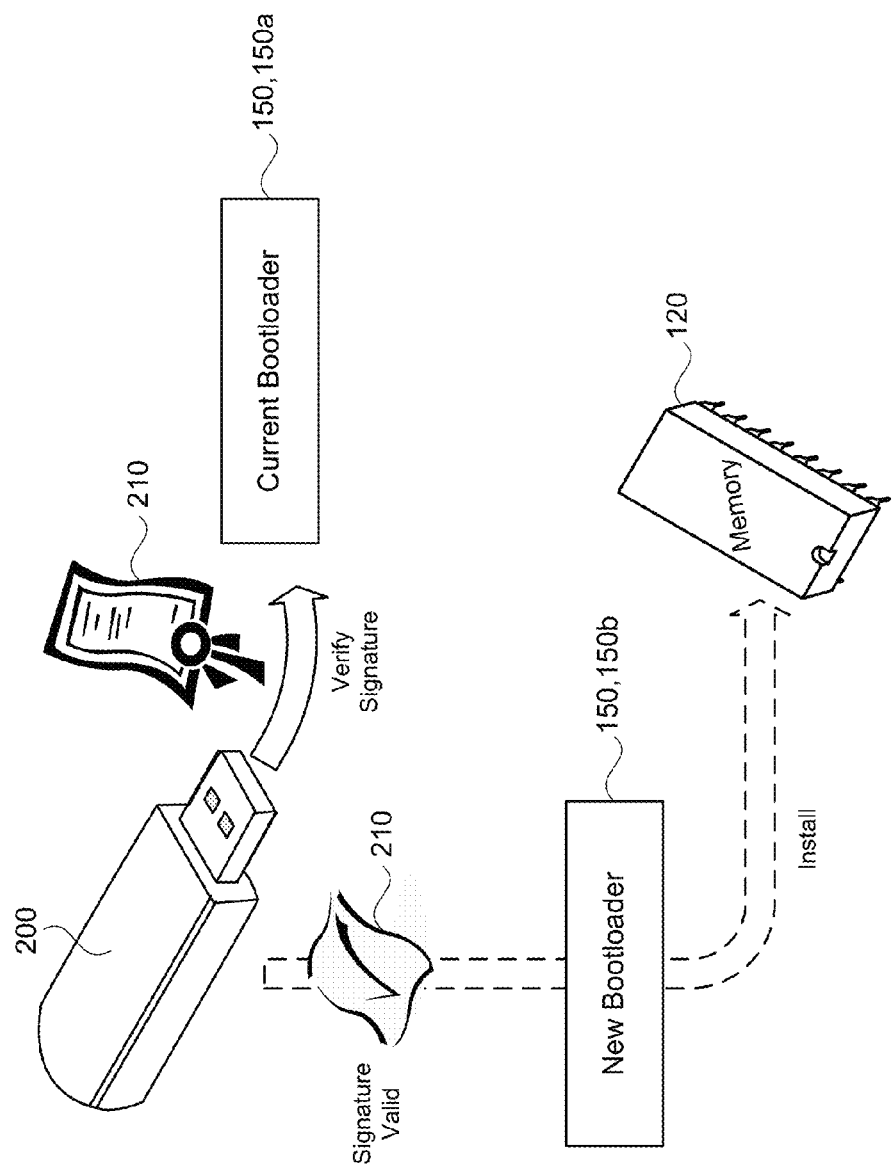
FIG. 4 is a schematic view of an exemplary storage device providing a signature file for verification and new boot loader for installation.

Referring to FIGS. 2-4, in some implementations, a method of secured replacement of the boot loader 150 includes booting up the electronic device 100 and connecting predefined IO terminals 132 of a circuit 130 on the electronic device 100 (e.g., shorting, shunting, connecting with an inverter, or otherwise connecting two test points together). Connection of the IO terminals 132 may include connecting a sender 132a to a receiver 132b. The current boot loader 150, 150a of the electronic device 100 transmits the connection key 152 bit by bit 154 from the sender 132a to the receiver 132b. In some implementations the current boot loader 150, 150a generates a random number (e.g., a 32 bit integer) for the connection key 152. The current boot loader 150a reads the sent connection key 152 from the receiver 132b and verifies each bit 154 to confirm correct connection of the two IO terminals 132. This may be a very fast check (e.g., less than 1 millisecond). Connection of the predefined IO terminals 132 (the sender 132a and the receiver 132b) provides a hardware security level that may trigger a recovery process or unlocking process for the electronic device 100.

The method also includes connecting the storage device 200 to the electronic device 100. After verification of the received connection key 152, the current boot loader 150a may enable/activate the storage device 200 (e.g., by enabling a corresponding USB port 170) to trigger a recovery process. The current boot loader 150a may determine if a signature 210 is present on the storage device 210 and verifies the signature 210 of the unique identifier for the electronic device 100 stored by the storage device 200. If the signature 210 is valid for the unique identifier, the current boot loader 150a checks for a new boot loader 150b on the storage device 200 and installs the new boot loader 150b on the electronic device 100 to replace the current boot loader 150a. For example, the new boot loader 150b may be stored in memory 120 on the electronic device 100. Once the new boot loader 150b is installed, the electronic device 100 may reboot using the new boot loader 150*b*. If the signature 210 for the unique identifier is invalid, the electronic devices 100 may boot using the current boot loader 150*a*.

In some implementations, the electronic device 100 includes locked features and the method is used to unlock those features or a subset of the features. Moreover, the method may be used for run-time unlocking of the electronic device 100. The boot loader 150 may be programmed to automatically upgrade the software 140 of the electronic device 100 in the field, for example, when a user or technician inserts the storage device 200 in the communication port 170 of the electronic device 100.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of replacing a boot loader of an electronic device, the method comprising:
   verifying, using a first boot loader executing on a computing processor of the electronic device, a shorted electrical connection between a sender input/output terminal of the electronic device and a receiver input/output terminal of the electronic device;
   reading a signature of a unique identifier of the electronic device from a removable storage device received by the electronic device;
   verifying the signature of the unique identifier of the electronic device; and
   allowing installation of a second boot loader on the electronic device when the signature is valid.

2. The method of claim 1, further comprising:
   sending a connection key from the sender terminal to the receiver terminal; and
   verifying receipt of the connection key from the receiver terminal.

3. The method of claim 2, further comprising generating the connection key as a random number.

4. The method of claim 2, further comprising sending the connection key bit-by-bit from the sender terminal to the receiver terminal and verifying each received bit, confirming correct connection of the sender terminal to the receiver terminal.

5. The method of claim 1, further comprising enabling a communication port receiving the removable storage device when correct connection of the input/output terminals is verified.

6. The method of claim 1, further comprising determining a presence of the signature of the unique identifier of the electronic device or the second boot loader on the storage device.

7. The method of claim 1, further comprising reading of the second boot loader from the storage device and storing the second boot loader in memory of the electronic device.

8. The method of claim 1, further comprising disallowing installation of the second boot loader when the signature is invalid.

9. The method of claim 1, further comprising booting the electronic device using the first boot loader when the signature is invalid.

10. The method of claim 1, further comprising booting the electronic device after installation of the second boot loader.

11. A method of booting an electronic device, the method comprising:
    initiating execution of a first boot loader on a computing processor of the electronic device;
    electrically connecting a sender input/output terminal of the electronic device to a receiver input/output terminal of the electronic device; and
    connecting a removable storage device to a connection port of the electronic device, the storage device storing a signature of a unique identifier of the electronic device and a second boot loader;
    wherein the first boot loader:
      verifies a shorted electrical connection between the input/output terminals;
      reads the signature of the unique identifier of the electronic device from the connected storage device;
      verifies the signature of the unique identifier of the electronic device; and
      allows installation of the second boot loader on the electronic device when the signature is valid.

12. The method of claim 11, wherein the first boot loader:
sends a connection key from the sender terminal to the receiver terminal; and
verifies receipt of the connection key from the receiver terminal.

13. The method of claim 12, wherein the first boot loader generates the connection key as a random number.

14. The method of claim 12, wherein the first boot loader sends the connection key bit-by-bit from the sender terminal to the receiver terminal and verifies each received bit to confirm correct connection of the sender terminal to the receiver terminal.

15. The method of claim 11, wherein the first boot loader enables the communication port when correct connection of the input/output terminals is verified.

16. The method of claim 1, wherein the first boot loader determines a presence of the signature of the unique identifier of the electronic device or the second boot loader on the storage device.

17. The method of claim 11, wherein the first boot loader initiates reading of the second boot loader from the storage device.

18. The method of claim 11, wherein the first boot loader disallows installation of the second boot loader when the signature is invalid.

19. The method of claim 11, further comprising booting the electronic device using the first boot loader when the signature is invalid.

20. The method of claim 11, further comprising booting the electronic device after installation of the second boot loader.

21. An electronic device comprising:
a circuit comprising:
memory storing a first boot loader;
a computing processor in communication with the memory, the processor executing the first boot loader; and
first and second input/output terminals in communication with the computing process; and
a communication port in communication with the circuit;
wherein the first boot loader
verifies a shorted electrical connection between the first and second input/output terminals;
reads the signature of the unique identifier of the electronic device from a storage device connected to the communication port;
verifies the signature of the unique identifier of the electronic device; and
allows installation of the second boot loader on the electronic device when the signature is valid.

22. The electronic device of claim 21, wherein the first boot loader:
sends a connection key from the sender terminal to the receiver terminal; and
verifies receipt of the connection key from the receiver terminal.

23. The electronic device of claim 22, wherein the first boot loader generates the connection key as a random number.

24. The electronic device of claim 22, wherein the first boot loader sends the connection key bit-by-bit from the sender terminal to the receiver terminal and verifies each received bit to confirm correct connection of the sender terminal to the receiver terminal.

25. The electronic device of claim 21, wherein the first boot loader enables the communication port when correct connection of the input/output terminals is verified.

26. The electronic device of claim 21, wherein the first boot loader determines a presence of the signature of the unique identifier of the electronic device or the second boot loader on the storage device.

27. The electronic device of claim 21, wherein the first boot loader initiates reading of the second boot loader from the storage device.

28. The electronic device of claim 21, wherein the first boot loader disallows installation of the second boot loader when the signature is invalid.

29. The electronic device of claim 1, wherein the first boot loader executes on the electronic device when the signature is invalid.

30. The electronic device of claim 21, wherein the storage device comprises a universal serial bus flash drive.

\* \* \* \* \*